United States Patent
Alexander et al.

(10) Patent No.: US 8,693,982 B2
(45) Date of Patent: *Apr. 8, 2014

(54) METHOD AND SYSTEM FOR MANAGING MOBILE TELEPHONE NUMBERS AND MOBILE TELEPHONE SUBSCRIBERS' DATA WITHOUT GEOGRAPHY-BASED RESTRICTION

(75) Inventors: James Robert Alexander, Bernardsville, NJ (US); Timothy D. DuHaime, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,471

(22) Filed: Feb. 15, 2012

(65) Prior Publication Data

US 2012/0150909 A1 Jun. 14, 2012

Related U.S. Application Data

(63) Continuation of application No. 12/257,011, filed on Oct. 23, 2008, now Pat. No. 8,190,122.

(51) Int. Cl.
   *H04M 11/00* (2006.01)
(52) U.S. Cl.
   USPC ........ 455/406; 455/435.1; 455/461; 455/551; 379/126; 379/114.27; 705/1.1
(58) Field of Classification Search
   USPC .......... 455/406, 461, 551, 435.1; 379/114.27, 379/126; 705/1.1
   See application file for complete search history.

(56) References Cited

U.S. PATENT DOCUMENTS

| | | |
|---|---|---|
| 5,448,622 A | 9/1995 | Huttunen |
| 5,465,288 A | 11/1995 | Falvey et al. |
| 5,887,253 A | 3/1999 | O'Neil et al. |
| 6,778,821 B1 | 8/2004 | Shunk |
| 7,684,554 B1 | 3/2010 | Vincent et al. |
| 2003/0187800 A1 | 10/2003 | Moore et al. |
| 2003/0231750 A1 | 12/2003 | Janveja et al. |
| 2004/0193604 A1 | 9/2004 | Cuckson et al. |
| 2005/0272448 A1 | 12/2005 | Tran et al. |
| 2006/0008066 A1* | 1/2006 | Starling et al. ........... 379/201.03 |
| 2006/0239427 A1 | 10/2006 | Cooke et al. |
| 2008/0025303 A1 | 1/2008 | Venkataswami et al. |
| 2008/0046477 A1 | 2/2008 | Schultz |
| 2008/0101582 A1 | 5/2008 | Hua et al. |
| 2008/0181386 A1 | 7/2008 | Creamer et al. |
| 2009/0274284 A1* | 11/2009 | Arsenault et al. .......... 379/142.1 |

OTHER PUBLICATIONS

Entire Prosecution of U.S. Appl. No. 12/257,011 to James Robert Alexander al. on Oct. 23, 2008, entitled, "Method and System for Managing Mobile Telephone Numbers and mobile Telephone Subscribers' Data Without Geography-Based Restriction."

* cited by examiner

*Primary Examiner* — Allahyar Kasraian

(57) ABSTRACT

A system manages subscribers' data of mobile telephones in a wireless network. Data servers are located according to geographic service areas, and each of the data servers may store subscribers' data of mobile telephones based on the respective geographic area. Location of subscribers' data is determined depending upon subscribers' ID, to which two or more Mobile telephone Numbers (MTNs) are assigned. Two or more MTNs may have different area codes for which subscribers' data are stored in at least two or more of the data servers. A terminal, for example, receives a user request calling for subscriber's data of a first MTN, retrieves a subscriber's ID corresponding to the first MTN from an Electronic Telephone Number Inventory (eTNI) database and sends a request containing the subscriber's ID. A router determines a first data server corresponding to the retrieved subscriber's ID and routes the request to the first data server.

20 Claims, 7 Drawing Sheets

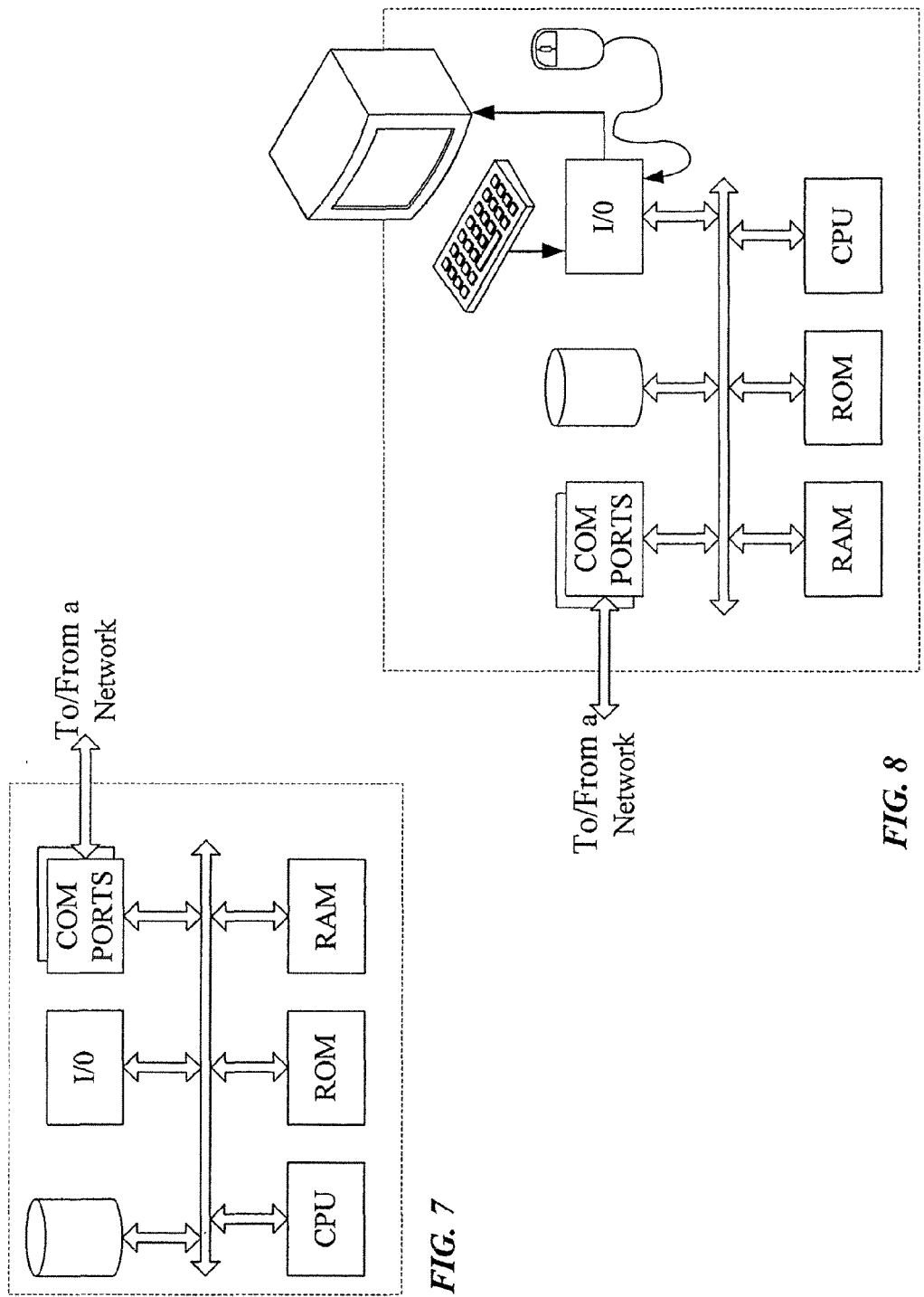

METHOD AND SYSTEM FOR MANAGING MOBILE TELEPHONE NUMBERS AND MOBILE TELEPHONE SUBSCRIBERS' DATA WITHOUT GEOGRAPHY-BASED RESTRICTION

RELATED APPLICATIONS

This application is a continuation of and claims the benefit of U.S. application Ser. No. 12/257,011, filed Oct. 23, 2008, now U.S. Pat. No. 8,190,122 B1, entitled "METHOD AND SYSTEM FOR MANAGING MOBILE TELEPHONE NUMBERS AND MOBILE TELEPHONE SUBSCRIBERS' DATA WITHOUT GEOGRAPHY-BASED RESTRICTION," the disclosure of which also is entirely incorporated herein by reference.

BACKGROUND

As mobile telephone service subscribers immensely increase, demand for Mobile Telephone Numbers (MTNs) and amount of subscribers' data to be handled, such as billing data, grow hugely corresponding to the increase of the mobile telephone service subscribers. The MTNs and the subscribers' billing data are grouped, managed and/or stored by billing or management systems located according to geographical boundaries. For example, a billing system specific to the Northeast area puts together and manages MTNs having the Northeast area code (e.g. New York City 212) and billing data for the MTNs having the Northeast area code. Correspondingly, other areas such as the Midwestern and the West coast have their own billing systems to manage MTNs having their own area codes and billing data for the MTNs having the area codes. Billing data for MTNs having New York City area code (212) are stored and managed by the Northeast billing system, whereas billing data for MTNs having Los Angeles area code (213) are managed and stored by the West Coast billing system.

Such a geographical restriction on MTNs of the subscribers' mobile telephones and management of billing data causes inconveniences to new or existing mobile telephone subscribers. When a new subscriber, a resident at Los Angeles, opens a mobile telephone at a Point-Of-Sale (POS) of in a different non-residence location, e.g. at store when visiting Washington D.C., the new subscriber has no choice but to have the area code of Washington D.C. (202), even if he wants to have the Los Angeles area code (213) as the area code of his mobile phone, since MTNs of mobile telephone subscribers are managed depending upon the geographic area of POS where the mobile telephone account is opened. Such inflexibility in choosing MTNs is the case with existing mobile telephone subscribers, even when the existing mobile telephone subscribers open another mobile telephone number under their existing mobile telephone accounts.

Moreover, the geography-based management of billing data cannot meet the mobile telephone subscriber's needs for receiving charges for plural mobile telephones that are opened as one bill under the name of the subscriber and for sharing minutes between the plural mobile telephones. For example, a new or existing subscriber having his own MTN with the NYC area code (212), who has plural mobile telephones under his or her name, wants to receive and pay one bill for charges for the plural mobile telephones, having the LA area code (213). However, since the billing data for the mobile telephone having the LA area code (213) is stored and managed by the billing system located in the West Coast area, and the billing data for the mobile telephone having NYC area code (212) is stored and managed by the billing system located in the Northeast area, the billing data for both telephones cannot be put together and charged under one subscriber account. This collective billing demand is desperate in the case of companies of which employees are scattered all over a variety of geographic areas.

Hence, a need exists for management of MTNs and billing data associated with the MTNs regardless of the geographic boundaries of the mobile telephone subscribers. Another need exist for allowing billing data of MTNs that are stored in a plurality of data servers depending upon geographical areas to be shared among the data servers.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7 illustrates a network or host computer platform, as may typically be used to implement a server.

FIG. 8 depicts a computer with user interface elements, as may be used to implement a personal computer or other type of work station.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed in the examples below provide a system for managing subscribers' data in a wireless network. The system may comprise a plurality of data servers, an Electronic Telephone Number Inventory (eTNI) database, a terminal located at a Point-Of-Sale (POS) and a router. Each of the plurality of data servers may store subscribers' data of mobile telephones based on geographic areas. The eTNI database stores the subscribers' IDs, and locations of subscribers' data corresponding to the subscribers' IDs. The subscriber's ID is an identification of a subscriber under which billing data of one or more MTNs are grouped and managed together. The location of the subscribers' data stored among the plurality of data servers is determined depending upon the subscribers' IDs. The terminal receives a request of subscriber's data of a first Mobile Telephone Number (MTN) and retrieves a subscriber's ID corresponding to the first MTN from the eTNI. The router determines a first data server corresponding to the retrieved subscriber's ID and routes the request to the first data server.

Often, two or more MTNs are assigned to the subscriber's ID, and sometimes the two or more MTNs have different area codes for which subscribers' data are stored in at least two or more of the plurality of data servers. An area of the terminal making a request may be different from an area of the first data server, and the area of the terminal and areas of the data servers are categorized according to MTN's area codes.

Figure 1:
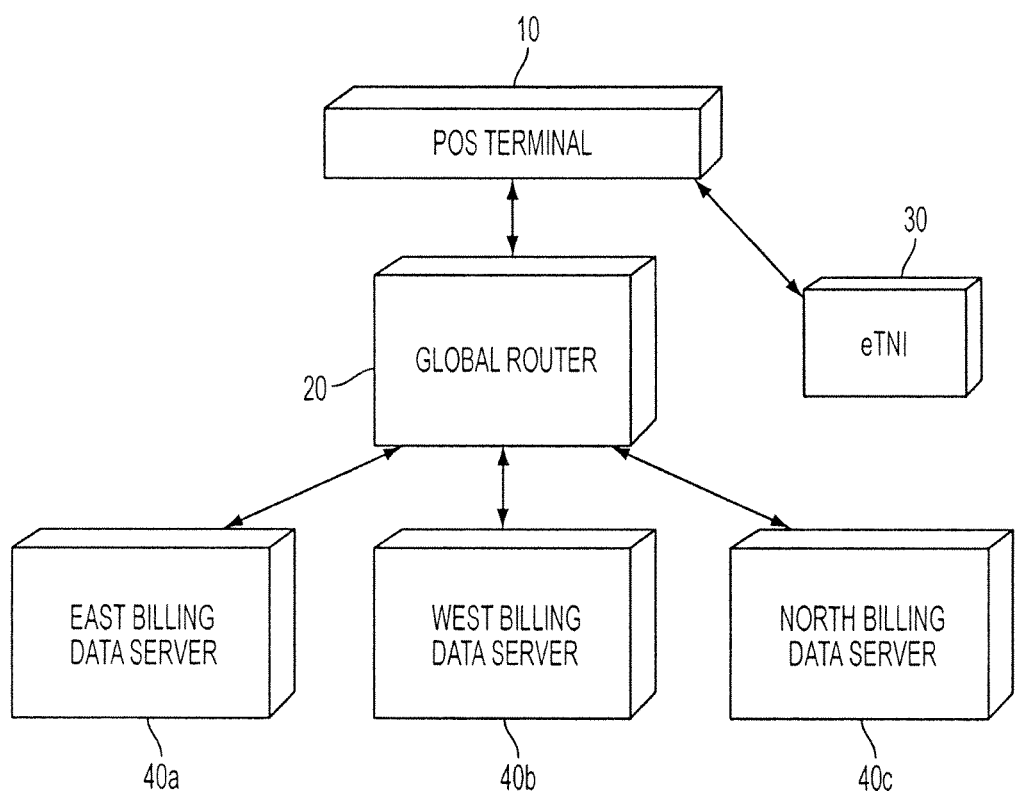
FIG. 1 is a billing management system that allows distantly located billing data systems to communicate and share billing data.

Management of Mobile Telephone Numbers (MTNs) and billing data for each MTN without restriction on geographic boundaries are implemented with a billing data management system which allows distantly located billing data systems to communicate and share billing data. Referring to FIG. 1, the billing management system includes a POS terminal 10 which is a computerized device installed at a front-end POS to deal with transactions such as opening a new subscriber's account or additional mobile telephones of existing subscribers and handling requests from subscribers regarding billing. The POS terminal 10 has a front-end application software to perform various transactions and communications with other elements in the billing management system.

At least logically, the POS terminal 10 is directly connected to a centralized global router 20 without involvement of any local billing data server hard-wired to the POS terminal 10. The centralized global router 20 is a device capable of computerized functions and has an Application Programming Interface (API) that allows the Point-Of-Sale (POS) terminal 10 to access a plurality of geographically-distributed billing data servers 40a~40c that store billing data of subscribers located or homed in the same area as serviced by respective billing data servers 40a~40c.

An Electronic Telephone Number Inventory (eTNI) database 30 is a database that stores MTNs regardless of their area codes. The eTNI database 30 is integrated into a wireless communication system, and serves as the central repository and inventory system for the wireless communication service provider's telephone number resources. The POS terminal 10 communicates with the eTNI database 30 via the wireless communication system, and refers to the eTNI database 30 for finding a subscriber's ID corresponding to a MTN of a mobile telephone. Two or more MTNs are grouped under each subscriber's ID.

The geographically-distributed billing data servers 40a~40c are located depending on geographical areas. For example, the billing data server 40a is located at the East area and stores billing data of MTNs having area codes of the East area and the billing data server 40b is located at the West Coast area and stores billing data of MTNs having the West Coast area codes. The billing data includes information specific to subscribers such as subscribers' IDs, names, addresses, price plans and rating schemes.

Figure 2:
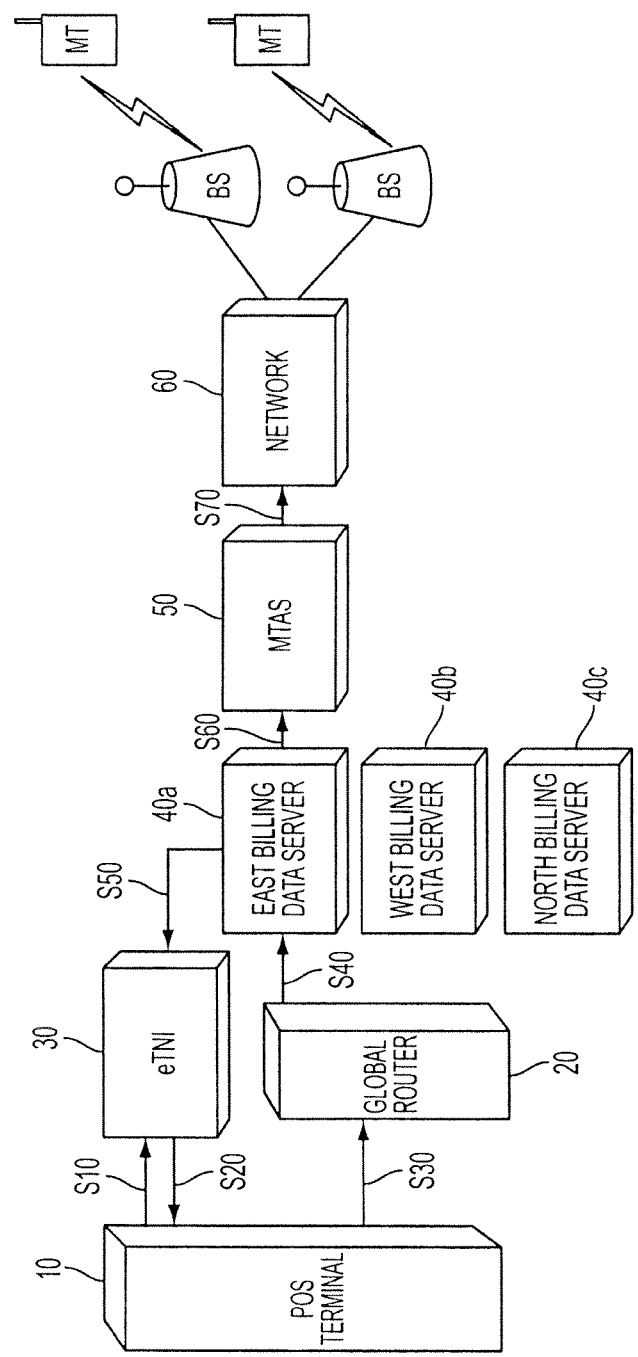
FIG. 2 illustrates a process to activate a new mobile telephone account.

For billing data of several MTNs to be consolidated on one subscriber's account, processes of activating new mobile telephones are required. Referring to FIG. 2, an exemplary process of activation of a new mobile telephone, which is not consolidated on a pre-existing subscriber's account, is described. The POS terminal 10 receives a request of activating a new mobile telephone from a new subscriber and sends a request for a new MTN to the ETNI 30. (S10) In response to the request from the POS terminal 10, the eTNI database 30 sends a new MTN, a new subscriber's ID corresponding to the new MTN, and the information such as address identifying a default billing data server in which billing data of the new MTN will be stored. (S20) Since the new MTN is not opened under pre-existing subscriber's account, a corresponding subscriber's ID is also created as well. The new MTN may have an area code of the area where the POS is located or an area code different from the POS-located area code. The default billing data server may be a billing data server to store billing data of MTNs having the POS-located area code, for example East billing data server 40a, or another billing data server to store billing data of MTNs having other area codes.

After receiving the new MTN for the new mobile phone, the new subscriber's ID, and the address of the default billing data server for the new MTN, the POS terminal 10 sends an activation request of the new MTN, to which the default billing data server, e.g. the East billing data server 40a, is designated, to the global router 20. (S30) The global router 20 forwards the activation request to the default billing data server, the East billing data server 40a in the example. (S40) The East billing data server 40a sends a confirmation that the activation of the new MTN has been processed to the eTNI database 30. (S50)

Following the confirmation, the East billing data server 40a sends a request to Mobile Terminating Access Service (MTAS) 50 requesting a wireless network 60 to provide mobile service to the mobile telephone having the newly activated MTN. (S60) The MTAS 50 receives the provisioning request from the East billing data server 40a, translates the provisioning request as appropriate for the wireless network 60 and sends the translated provisioning request to the wireless network 60. (S70) The wireless network 60 is connected to a plurality of Base Stations (BSs) covering a plurality of Mobile Telephones (MTs). As an alternative way to send the provisioning request to the MTAS 50, the mobile phone having the new MTN may send the provisioning request over the air to the MTAS 50 after the POS terminal 10 receives the confirmation from the billing data server 40a.

Therefore, the new mobile telephone may have the new MTN having an area code that the new subscriber wants and is different from the area of the POS terminal 10. Although the new MTN has an area code different from the area of the POS terminal 10 and the billing data are stored in the billing data server corresponding to the area of the POS terminal, management of billing data according to the subscriber's ID rather than the MTN allows the billing data for the new mobile telephone to be stored at a billing data server, without restriction by the POS area where the new mobile telephone is opened.

Figure 3:
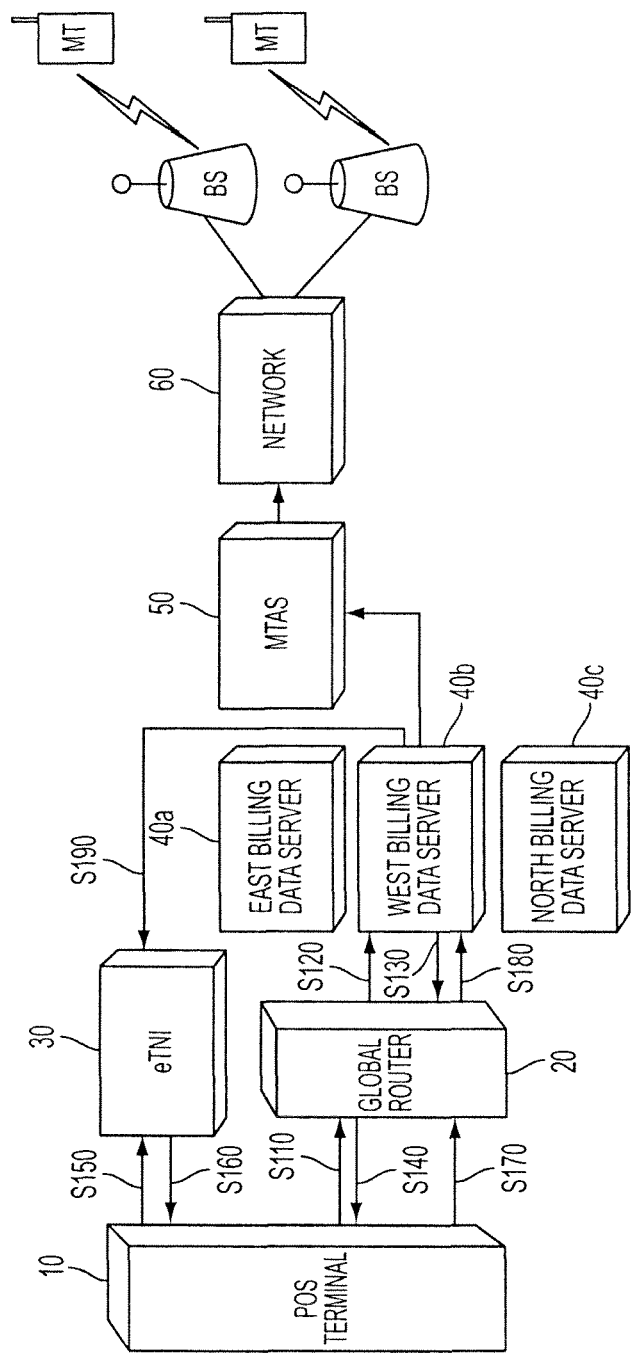
FIG. 3 illustrates a process to activate a new mobile telephone under a pre-existing subscriber's account.

Referring to FIG. 3, a process of activating a new MTN under an existing subscriber's account is described. A POS terminal 10 located for example in Washington D.C. receives a request for activating a new mobile telephone under an account of a pre-existing subscriber as well as a subscriber's ID of the pre-existing subscriber. Since the new MTN is opened under a pre-existing subscriber's account, the POS terminal 10 obtains the subscriber's ID of the pre-existing subscriber when the request for activating a new mobile telephone is received. The POS terminal 10 sends a request for subscriber information of the pre-existing subscriber as well as the subscriber's ID to the global router 20. (S110) The global router 20 sends the request for subscriber information including billing data to a billing data server, e.g. West billing data server 40b based on the subscriber's ID, in which the pre-existing subscriber's information including billing data is stored. (S120) In response to the request for subscriber information, the West billing data server 40b sends the global router 20 the subscriber's information of the pre-existing subscriber. (S130) The global router 20 forwards the subscriber information of the pre-existing subscriber to the POS terminal 10. (S140) Following receipt of the subscriber information, the POS terminal 10 sends a request for a new MTN for assignment to the new mobile telephone opened under the pre-existing subscriber's account to the eTNI database 30. (S150) The eTNI database 30 sends the POS terminal 10 a new MTN having the Washington D.C. area code (202) as well as an assigned default billing data server, e.g. East billing data server 40a, corresponding the Washington D.C. area code (202). (S160)

The POS terminal 10 forwards the new MTN having the Washington D.C. area code for the new mobile phone and the default billing data server, East billing data server 40a, to the global router 20. (S170) After receiving the default billing data server assigned to the new MTN, the global router 20 has, as a billing data server for the new MTN, two billing data servers for the new MTN, the billing data server of the pre-existing subscriber, the West billing data server 40b, and the default billing data server assigned to the new MTN based on the area code of the new MTN, the East billing data server 40a. The billing data server of the pre-existing subscriber, the West billing data server 40b, takes precedence over the default billing data server assigned based on the area code of the new MTN as a billing data server for the new mobile phone having the new MTN. The global router 20 sends the activation request of the new MTN to the billing data server of the pre-existing subscriber, the West billing data server 40b in our example. (S180) Since the billing data server of the pre-existing subscriber, the West billing data server 40b, is used for storing and managing billing data for the new mobile phone having the Washington D.C. area code (202), the new mobile phone may have a different area code from that of the pre-existing subscriber's MTN, and the billing data of the new mobile telephone can be managed together with the billing data of the pre-existing subscriber under the pre-existing subscriber's account.

The West billing data server 40b activates the new mobile phone with the new MTN and sends the eTNI database 30 a confirmation that the new mobile phone has been activated and the billing data server for the new mobile phone is the billing data server of the pre-existing subscriber, the West billing data server 40b. (S190) The West billing data server 40b, then, sends the MTAS 50 a provisioning request requesting a wireless network 60 to provide mobile service to the mobile telephone having the activated MTN. (S200) The MTAS 50 receives the provisioning request from the West billing data server 40b, translates the provisioning request appropriate for the wireless network 60 and sends the translated provisioning request to the wireless network 60. (S210) As an alternative way to send the provisioning request to the MTAS 50, the mobile phone with the subscriber's ID may send the provisioning request over the air to the MTAS 50 after the POS terminal 10 receives the confirmation from the billing data server 40b.

Following the above addressed processes, all billing data for the new mobile telephone is pooled together with the billing data of the pre-existing subscriber and is managed under the pre-existing subscriber's account.

Figure 4:
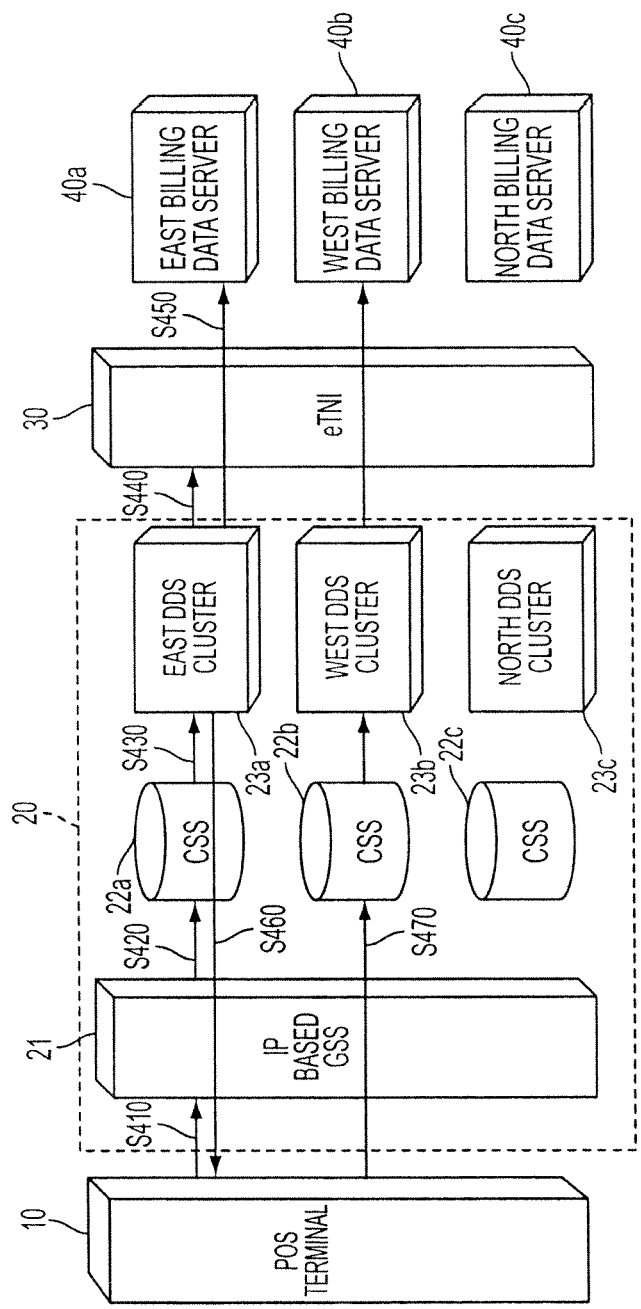
FIG. 4 illustrates a routing process of the global router in a case in which the global router routes transactions for which a Point-Of-Sale (POS) terminal does not specify a billing data server.

Exemplary procedures of the global router's routing transactions, which routes transactions requested by the POS terminal 10 to an appropriate billing data server, are explained below. The transactions include a request for billing data which is requested by a subscriber at the POS and processed via the POS terminal 10 at the POS. FIG. 4 illustrates routing process of the global router in case that the global router 20 routes transactions for which the POS terminal 10 does not specify a billing data server. Referring to FIG. 4, the global router 20 is a collection of functionalities implemented by application modules, which perform specific functionalities, i.e. IP based Global Site Selector (GSS) 21, Content Service Switches (CSSs) 22a~22c, and Distributed Data Service (DDS) clusters 23a~23c. The GSS 21 ensures Web-based applications to be always available by detecting site outages or site congestion and rerouting content requests and offloads Domain Name System (DNS) servers by taking over the domain resolution process. The CSSs 22a~22c balance and direct all session traffic on a distributed website. The CSSs 22a~22c are composed of CSSs 22a~22c corresponding to geography-based billing data servers 40a~40c. The DDS clusters 23a~23c are links between the Front-end POS terminal and the back end billing and data management systems.

Still referring to FIG. 4, a subscriber requests a transaction at a POS terminal 10 and the POS terminal 10 sends a transaction request to the GSS 21 (S410). The request includes location of the POS terminal 10, and the request does not specify a billing data server to which the request is routed. The GSS 21 forwards the transaction request to a CSS 22a corresponding to the location of the POS terminal 10. (S420) The CSS 22a routes the transaction request to a corresponding DDS cluster 23a. (S430) The DDS cluster 23a sends the eTNI 30 database the transaction request to find an appropriate billing data server for the subscriber and the eTNI database 30 returns a subscriber's ID to the DDS cluster 23a. (S440) After receiving the subscriber's ID, an appropriate billing data server corresponding to the subscriber's ID is determined based on the subscriber's ID. When the appropriate billing data server (40a) identified from the eTNI 30 is the billing data server (40a) determined by the location of the POS terminal, the transaction request is sent to the billing data server 40a determined by the location of the POS terminal 10. (S450)

When the appropriate billing data server (40b) identified from the eTNI 30 is not the billing data server (40a) determined by the location of the POS terminal, the transaction request is redirected back to the POS terminal 10 through the DDS cluster 23a, the CSS 22a and the GSS 21. (S460) The POS terminal 10 reroutes the transaction request to the appropriate billing data server 40b through the GSS 21 and the CSS 22b and the DDS Cluster 23b that correspond to the appropriate billing data server 40b. (S470)

Figure 5:
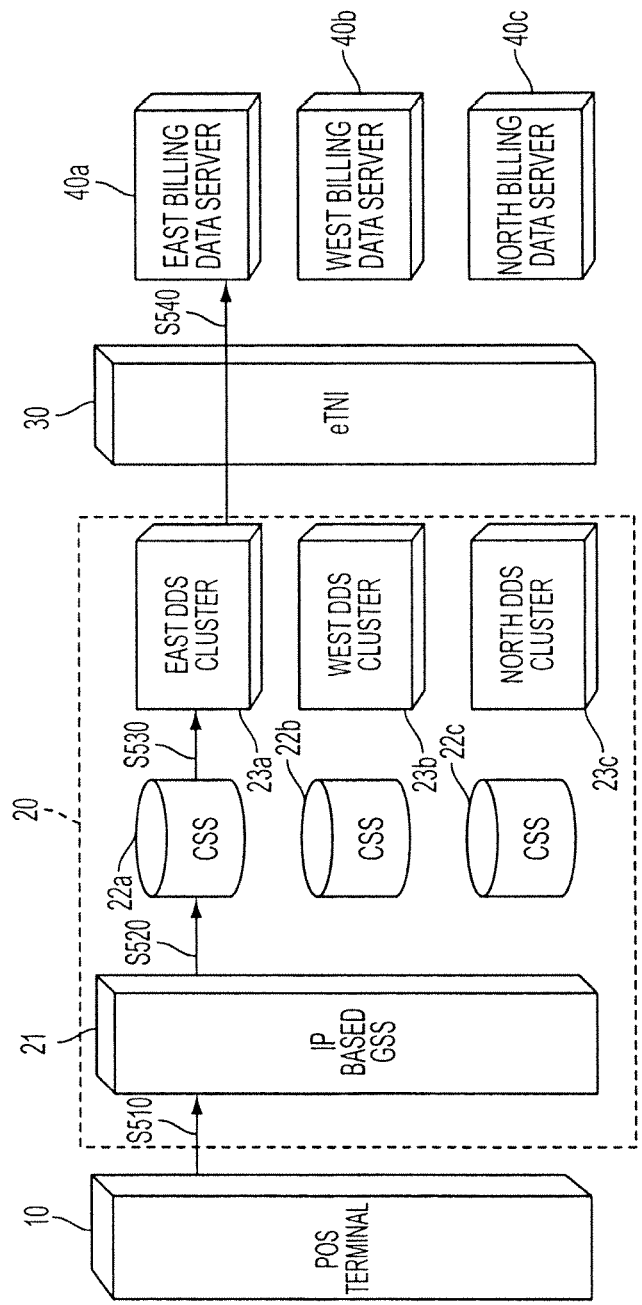
FIG. 5 illustrates a routing process of the global router in a case in which the global router routes transactions for which the POS terminal specifies a billing data server.

FIG. 5 illustrates a routing process of the global router in case that the global router 20 routes transactions for which the POS terminal 10 specifies a billing data server. Referring to FIG. 5, a subscriber requests a transaction at a POS terminal 10 and the POS terminal 10 sends transaction requests to the GSS 21 (S510). The request includes location of the POS terminal 10 and the request specifies a billing data server to which the request is routed, e.g. the East billing data server 40a. The GSS 21 forwards the transaction request to a CSS 22a corresponding to the specified billing data server 40a. (S520) The CSS 22a routes the transaction request to a corresponding DDS cluster 23a. (S530) The DDS cluster 23a sends the transaction request to the specified billing data server, the East billing data server 40a, without referring to the eTNI database 30. (S540)

When two or more pre-existing subscribers want to group their accounts, share their minutes, and receive their billings under one account, the pre-existing subscribers' accounts need to be grouped together under one of the pre-existing subscribers' accounts having the one subscriber ID. As a way to consolidate two or more pre-existing subscribers' accounts under one subscriber's account, an exemplary process to reassign billing data of two or more pre-existing subscribers on a billing data server will be described hereinafter.

Figure 6:
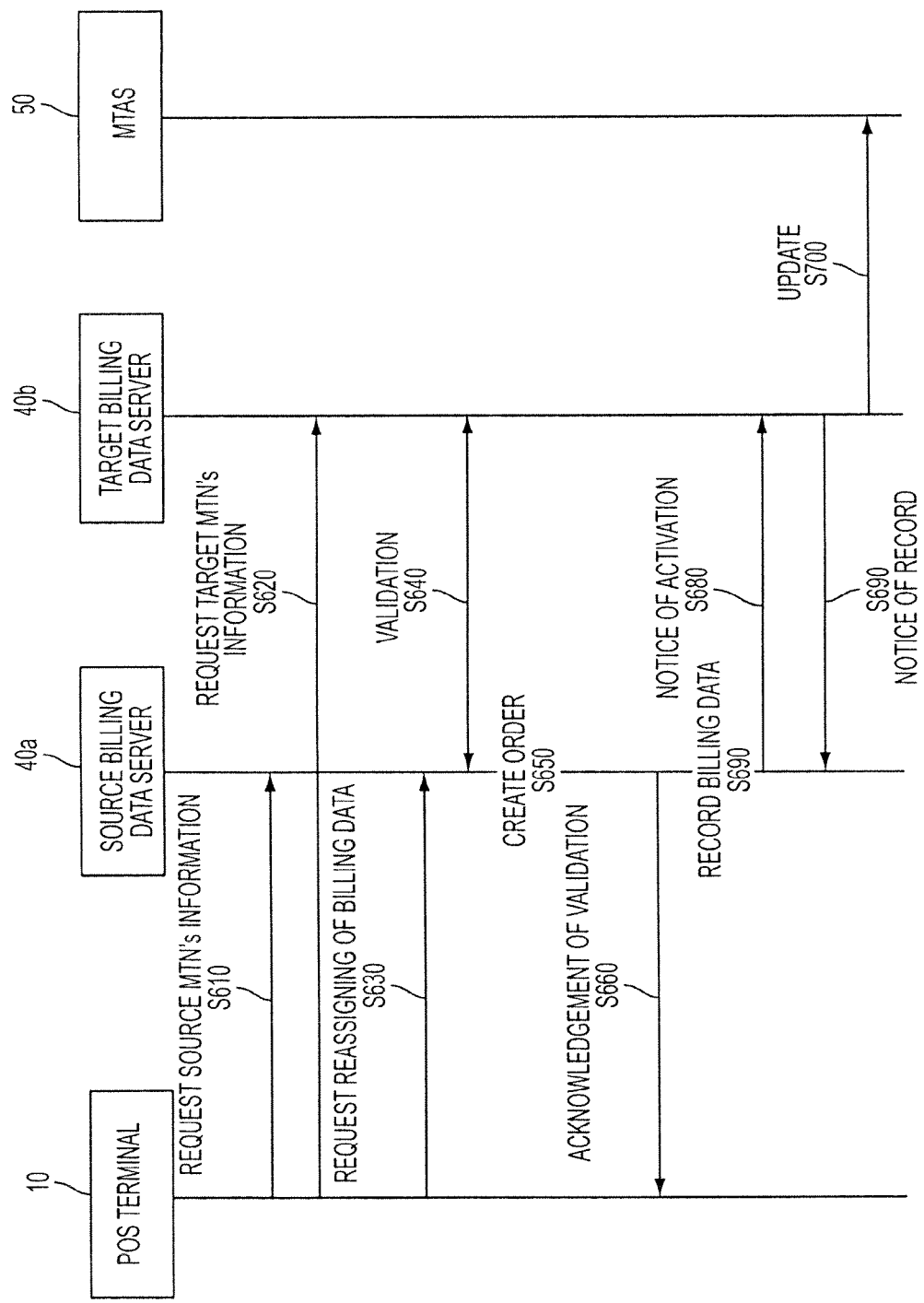
FIG. 6 illustrates a process to reassign a subscriber's billing data stored at a source billing data server to a target billing data server where billing data of another subscriber is stored.

FIG. 6 illustrates a process to reassign a subscriber's billing data stored at a source billing data server, e.g. the East billing data server, to a target billing data server, e.g. the West billing data server, where billing data of another subscriber is stored. Referring to FIG. 6, the POS terminal 10 receives a source MTNa, for which billing data is moved, and sends a request for subscriber information for the source MTNa to the East billing data server 40a that is the billing data server corresponding to the source MTNa. (S610) At the same time, the POS terminal 10 receives a target MTNb, for the subscriber's account to which the billing data of the source MTNa is moved, and sends a request for subscriber's information to the West billing data server 40b that is the billing data server corresponding to the target MTNb. (S620) After receiving the subscribers' information for both the source MTNa and the target MTNb, the POS terminal 10 sends the East billing data server 40a a request to reassign the billing data of the source MTNa stored in the East billing data server to the West billing data server where the billing data of the target MTNb is stored. (S630) Deliveries of the requests and information between the POS terminal 10 and the billing data servers 40a, 40b in the steps S610 to S630 may be performed by the global router 20.

After the request to reassign the billing data is received by the East billing data server, a validation between the East billing data server (the source data server) 40a and the West billing data server (the target data server) 40b is performed. During the validation, subscribers' information corresponding to the source MTNa and the target MTNb is exchanged between the East billing data server (the source billing data server) 40a and the West billing data server (the target billing data server) 40b. (S640) The East billing data server 40a (the source billing data server) creates order to reassign billing data after the subscribers' information is exchanged. (S650) The East billing data server 40a (the source billing data server) sends the POS terminal 10 an acknowledgement that the validation is finished. (S660) The acknowledgement may be an acceptance of the reassignment order or a notice of failed validation. In the interim, the East billing data server 40a (the source billing data server) records billing data of the source MTNa until an actual movement of the billing data of the source MTNa is successfully completed. (S670)

The East billing data server 40a sends a notice of activation of reassign to the West billing data server 40b. (S680) The West billing data server 40b (the target billing data server) groups together and records the billing data of the source MTNa and the target MTNb under one subscriber's account, and sends a notice of record to the East billing data server 40a. (S690) After the consolidation of the billing data of the MTNa and the MTNb under one subscriber's account in the West billing data server 40b, the consolidation of billing data is updated to the MTAS 50. (S700)

As shown by the above discussion, functions relating to mobile number and billing data transactions and associated message routing are implemented on computers connected for data communication via the components of a packet data network, operating as a global router, a billing data server and/or as an eTNI database server as shown in FIG. 1. Although special purpose devices may be used, such devices also may be implemented using one or more hardware platforms intended to represent a general class of data processing device commonly used to run 'server' and or terminal programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. tables for the routing and/or user's messages. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for managing subscribers' data without geographic restriction, in essentially the manner performed in the implementations discussed and illustrated herein.

FIGS. 7 and 8 provide functional block diagram illustrations of general purpose computer hardware platforms. FIG. 7 illustrates a network or host computer platform, as may typically be used to implement a server such as a server providing the eTNI, the global router or one of the billing data server. FIG. 8 depicts a computer with user interface elements, as may be used to implement a personal computer or other type of work station, e.g. for a user terminal or a point of sale terminal, although computer of FIG. 8 may also act as a server if appropriately programmed. A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of managing mobile telephone subscriber's data outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the global router 20 or the POS terminal 10. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the routing process by the global router 20, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

MTN: Mobile telephone Number
POS: Point-Of-Sale
eTNI: Electronic Telephone Number Inventory
API: Application Programming Interface
MTAS: Mobile Terminating Access Service
GSS: Global Site Selector
CSS: Content Service Switch
DDS: Distributed Data Service
DNS: Domain Name System
CPU: Central Processing Unit

What is claimed is:

1. A system, comprising:
a plurality of data servers each configured to store account related data for mobile telephones of subscribers to wireless communication service provided by one wireless network operator, wherein each of the data servers is configured to by default store account related data for mobile telephones based on geographic areas corresponding to mobile telephone numbers (MTNs) assigned to the mobile telephones of subscribers;
an Electronic Telephone number Inventory (eTNI) database configured to store an inventory of the wireless network operator's MTNs and subscribers' identifications (IDs) corresponding to the MTNs assigned to the mobile telephones of the subscribers and to locations among the plurality of data servers of subscribers account related data, wherein:
(a) at least some of the account related data of one or more of the subscribers is located on one or more of the data servers based upon subscriber identification (ID) rather than a geographic area corresponding to MTNs, and
(b) account data for multiple mobile telephones for a subscriber having multiple mobile telephones assigned MTNs corresponding to different ones of the geographic areas is consolidated, regardless of the geographic areas corresponding to the assigned MTNs, on one of the data servers under one subscriber ID assigned to the subscriber having the multiple mobile telephones; and
a router configured to: receive a request for subscriber account data relating to a first MTN, the request including a subscriber ID corresponding to the first MTN obtained from the eTNI database without user interaction, and forward the request to a first one of the data servers corresponding to the subscriber ID included in the received request; and
a terminal configured to:
receive a user request requesting subscriber data relating to the first MTN;
automatically obtain the subscriber ID from the eTNI database;
automatically combine the user request with the subscriber ID to form the request including the subscriber ID; and
automatically forward to the router the request including the subscriber ID corresponding to the first MTN, wherein:
a geographic area of the terminal is different from a geographic area of the first data server; and
the geographic areas of the terminal and data servers are categorized according to area codes of the MTNs.

2. The system of claim 1, wherein the router comprises:
a Global Site Selector (GSS) communicating with the terminal; and
Content Service Switches (CSSs) and Distributed Data Service (DDS) clusters corresponding to respective ones of the data servers, for forwarding the request to the first data server.

3. The system of claim 1, wherein the data servers are configured to store subscribers billing data as at least some of the account related data for mobile telephones.

4. The system of claim 3, wherein the request for subscriber account data relating to the first MTN includes a request for retrieval of billing data of the first MTN.

5. The system of claim 1, wherein the first data server is a data server that stores account related data for one or more mobile telephones of a subscriber corresponding to the obtained subscriber ID corresponding to the first MTN.

6. The system of claim 1, wherein:
the plurality of data servers are located according to geographic areas, and
each of the plurality of data servers is configured to by default store subscribers account related data of MTNs having area codes of geographic areas that each of the plurality of data servers covers.

7. The system of claim 1, wherein the request for subscriber account data relating to the first MTN includes a request for opening a new mobile telephone account.

8. The system of claim 1, wherein the request for subscriber account data relating to the first MTN includes a request for opening a new MTN under an existing mobile telephone account.

9. The system of claim 1, wherein the subscriber ID is an identification of a subscriber under which billing data of one or more MTNs are grouped and managed together.

10. A method, comprising steps of:
storing on a plurality of data servers account related data for mobile telephones of subscribers to wireless communication service provided by one wireless network operator, the storing step comprising:
(a) storing at least some account related data for the mobile telephones by default at locations on respective ones of the data servers based on geographic areas corresponding to mobile telephone numbers (MTNs) assigned to the mobile telephones of subscribers,
(b) storing at least some of the account related data of one or more of the subscribers on one or more of the data servers based upon subscriber identification (ID) rather than geographic areas corresponding to the MTNs of the subscribers, and
(c) storing account data for multiple mobile telephones for a subscriber having multiple mobile telephones assigned MTNs corresponding to different ones of the geographic areas together on one of the data servers under one subscriber ID assigned to the subscriber having the multiple mobile telephones;
maintaining an Electronic Telephone Number Inventory (eTNI) database storing an inventory of the one wireless network operator's MTNs and subscribers IDs corresponding to the MTNs assigned to telephones of the subscribers and to locations among the plurality of data servers of subscribers account related data;
receiving a user request for subscriber account data relating to a first MTN at a terminal, wherein the terminal is configured to:
automatically obtain a subscriber ID corresponding to the first MTN from the eTNI database;
automatically combine the user request with the subscriber ID to form a request including the subscriber ID corresponding to the first MTN; and
forward the request including the subscriber ID corresponding to the first MTN, to a first one of the data servers corresponding to the subscriber ID included in the received request, wherein:
a geographic area of the terminal is different from a geographic area of the first data server, and
the geographic areas of the terminal and data servers are categorized according to area codes of the MTNs.

11. The method of claim 10, wherein the data servers are configured to store subscribers billing data as at least some of the account related data for mobile telephones.

12. The method of claim 11, wherein the request for subscriber account data relating to the first MTN includes a request for retrieval of billing data of the first MTN.

13. The method of claim 10, wherein the first data server is a data server that stores account related data for one or more mobile telephones of a subscriber corresponding to the obtained subscriber ID corresponding to the first MTN.

14. The method of claim 10, wherein:
the plurality of data servers are located according to geographic areas, and
each of the plurality of data servers is configured to by default store subscribers account related data of MTNs having area codes of geographic areas that each of the plurality of data servers covers.

15. The method of claim 10, wherein the request for subscriber account data relating to the first MTN includes a request for opening a new mobile telephone account.

16. The method of claim 10, wherein the request for subscriber account data relating to the first MTN includes a request for opening a new MTN under an existing mobile telephone account.

17. A method, comprising steps of:
storing on a plurality of data servers account related data for mobile telephones of subscribers to wireless communication service provided by one wireless network operator, the storing step comprising:
(a) storing at least some account related data for mobile telephones by default at locations on respective ones of the data servers based on geographic areas corresponding to mobile telephone numbers (MTNs) assigned to the mobile telephones of subscribers,
(b) storing at least some of the account related data of one or more of the subscribers on one or more of the data servers based upon subscriber identification (ID) rather than geographic area corresponding to MTNs, and
(c) storing account data for multiple mobile telephones for a subscriber having multiple mobile telephones assigned MTNs corresponding to different ones of the geographic areas together on one of the data servers under one subscriber ID assigned to the subscriber having the multiple mobile telephones;
receiving a request for new MTN;
assigning a new MTN in response to the request, based on an area of origin of the request;
initially assigning a first one of the data servers with respect to the newly assigned MTN, by default based on a geographic area corresponding to the newly assigned MTN;
obtaining, without user interaction, the subscriber ID for a subscriber having a mobile telephone to receive assignment of the newly assigned MTN; and
routing an activation request regarding the newly assigned MTN to a second one of the data servers, instead of the first data server, based on the obtained subscriber ID contained in the activation request.

18. The method of claim 17, further comprising maintaining an Electronic Telephone Number Inventory (eTNI) database storing an inventory of the wireless network operator's MTNs and subscribers IDs corresponding to the MTNs assigned to telephones of the subscribers and to locations among the plurality of data servers of subscribers account related data.

19. The method of claim 18, wherein:
the subscriber having the mobile telephone to receive assignment of the newly assigned MTN has a pre-existing account;
data of the pre-existing account is already stored on the second one of the data servers; and
the step of obtaining the subscriber ID comprises obtaining a subscriber ID corresponding to the pre-existing account from the eTNI database.

20. The method of claim 17, wherein:
the request for opening a new MTN is received at a terminal;
the assigning of the new MTN in response to the request is based on an area of the terminal; and
the activation request is sent from the terminal.

* * * * *